US012565103B2

(12) United States Patent
Yamashita et al.

(10) Patent No.: US 12,565,103 B2
(45) Date of Patent: Mar. 3, 2026

(54) DISPLAY SYSTEM MOUNTED ON A VEHICLE THAT TRAVELS IN A DRIVING MODE SELECTED FROM AMONG A PLURALITY OF DRIVING MODES HAVING DIFFERENT DEGREES OF AUTONOMY OF DRIVING TASKS

(71) Applicant: TOYOTA JIDOSHA KABUSHIKI KAISHA, Toyota (JP)

(72) Inventors: Kana Yamashita, Yokohama (JP); Takashi Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 18/661,989

(22) Filed: May 13, 2024

(65) Prior Publication Data

US 2024/0383335 A1     Nov. 21, 2024

(30) Foreign Application Priority Data

May 16, 2023     (JP) ................................. 2023-080933

(51) Int. Cl.
| | |
|---|---|
| *B60K 35/80* | (2024.01) |
| *B60K 35/28* | (2024.01) |
| *B60W 50/00* | (2006.01) |
| *B60W 50/14* | (2020.01) |
| *G06V 20/59* | (2022.01) |

(52) U.S. Cl.
CPC .............. *B60K 35/80* (2024.01); *B60K 35/28* (2024.01); *B60W 50/14* (2013.01); *G06V 20/597* (2022.01); *B60W 2050/0083* (2013.01); *B60W 2050/146* (2013.01); *B60W 2540/225* (2020.02)

(58) Field of Classification Search
None
See application file for complete search history.

(56) References Cited

U.S. PATENT DOCUMENTS

| | | |
|---|---|---|
| 2020/0051529 A1 | 2/2020 | Higashiyama et al. |
| 2021/0070221 A1* | 3/2021 | Neiswander ........... B60K 35/28 |
| 2021/0252982 A1 | 8/2021 | Yasui et al. |

FOREIGN PATENT DOCUMENTS

| | | | |
|---|---|---|---|
| DE | 102011084887 A1 * | 4/2013 | ........... B60K 28/066 |
| JP | 2015-217798 A | 12/2015 | |

(Continued)

OTHER PUBLICATIONS

Espacenet English Translation of WO-2022244618-A1 (Year: 2022).*
Espacenet English Translation of DE-102011084887-A1 (Year: 2013).*

*Primary Examiner* — James J Lee
*Assistant Examiner* — Andrew Sang Kim
(74) *Attorney, Agent, or Firm* — Dinsmore & Shohl LLP

(57)     ABSTRACT

A display system mounted on a vehicle that travels in a driving mode selected from among a plurality of driving modes having different degrees of autonomy of driving tasks, the display system includes: a display unit configured to display information to a driver; and a control unit configured to execute at least one of setting a refresh interval of predetermined information displayed on the display unit to be longer than that before a driving mode change and setting visibility of the predetermined information to be lower than that before the driving mode change, when a degree of autonomy decreases due to the driving mode change.

6 Claims, 12 Drawing Sheets

(56)          References Cited

FOREIGN PATENT DOCUMENTS

| JP | 2017-206133 A | 11/2017 | |
| JP | 2019-123373 A | 7/2019 | |
| JP | 2019-203846 A | 11/2019 | |
| JP | 2020-024578 A | 2/2020 | |
| JP | 2020-086252 A | 6/2020 | |
| JP | 2021131282 A | 9/2021 | |
| WO | WO-2022244618 A1 * | 11/2022 | .............. G09G 5/36 |

* cited by examiner

DISPLAY SYSTEM MOUNTED ON A VEHICLE THAT TRAVELS IN A DRIVING MODE SELECTED FROM AMONG A PLURALITY OF DRIVING MODES HAVING DIFFERENT DEGREES OF AUTONOMY OF DRIVING TASKS

CROSS-REFERENCE TO RELATED APPLICATION

This application is based on Japanese Patent Application No. 2023-080933 filed with Japan Patent Office on May 16, 2023, the entire contents of which are hereby incorporated by reference.

TECHNICAL FIELD

The present disclosure relates to a display system.

BACKGROUND

Japanese Patent Application Publication No. 2017-206133 discloses a display system for a vehicle. This system is mounted on a vehicle traveling in a driving mode selected from a manual driving mode, an autonomous driving mode requiring constant monitoring, and an autonomous driving mode not requiring constant monitoring. This system includes a display unit that displays a surrounding situation of a vehicle and a control unit that controls the display unit. The control unit switches a display range of the display unit according to switching of a driving mode of the vehicle. The control unit sets the display range to a narrow range in a manual driving mode, sets the display range to a middle range in an autonomous driving mode requiring constant monitoring, and sets the display range to a wide range in an autonomous driving mode not requiring constant monitoring.

SUMMARY

The information displayed on the display unit tends to increase with an increase in the function of driving support. When the amount of information displayed on the display unit increases, in the display system described in Japanese Patent Application Publication No. 2017-206133, the frequency at which the driver views the display unit may increase or the time during which the driver views the display unit may increase. As a result, the driver's attention to the surrounding environment may be reduced. The disclosure provides a technique for appropriately suppressing the frequency with which a driver views a display unit when the degree of autonomy of a driving task decreases due to a change in driving mode as compared to that before the driving mode change.

A display system according to an aspect of the disclosure is a system mounted on a vehicle that travels in a driving mode selected from a plurality of driving modes in which degrees of autonomy of driving tasks are different. The display system includes a display unit and a control unit. The display unit displays information to a driver. The control unit performs at least one of setting a refresh interval of predetermined information displayed on the display unit to be longer than that before the driving mode change and setting visibility of the predetermined information to be lower than that before the driving mode change when a degree of autonomy decreases due to the driving mode change.

According to this display system, when the degree of autonomy decreases due to the driving mode change as compared to before the driving mode change, at least one of making the refresh interval of the predetermined information displayed on the display unit longer than before the driving mode change and making the visibility of the predetermined information lower than before the driving mode change is performed. When the degree of autonomy of the driving task decreases due to the driving mode change compared to that before the driving mode change, the driver needs to pay more attention to the surroundings of the vehicle than before the driving mode change. In the display unit, information with a long refresh interval and information with reduced visibility can be prevented from attracting the attention of the driver. Therefore, in a case where the degree of autonomy of the driving task decreases due to the driving mode change as compared to before the driving mode change, the display system can appropriately suppress the frequency with which the driver views the display unit.

In one embodiment, the control unit may determine at least one of a timing at which the refresh interval is made longer than before the driving mode change and a timing at which the visibility is made lower than before the driving mode change, in accordance with a difference in degree of autonomy before and after the driving mode change. In this case, the display system can change at least one of refresh interval and visibility at a timing corresponding to a difference in degree of autonomy before and after the driving mode change.

In one embodiment, the display system may further include a driver monitoring sensor, the plurality of driving modes may include a basic driving mode in which the driver performs all or part of a driving task, and the control unit may include determining whether or not a driver of the vehicle is gazing at the display unit based on a detection result of the driver monitoring sensor when the vehicle travels in the basic driving mode, and performing at least one of lengthening the refresh interval and lowering the visibility when it is determined that the driver gazes at the display unit. When the vehicle travels in the basic driving mode, the driver needs to pay attention to the surroundings of the vehicle. In the display unit, information with a long refresh interval and information with reduced visibility can be prevented from attracting the attention of the driver. Therefore, when the vehicle travels in the basic driving mode, the display system can the vehicle travels in the basic driving mode.

In one embodiment, the control unit may include determining whether or not the driver is drawn to the display unit based on a detection result of the driver monitoring sensor when the vehicle travels in the basic driving mode, performing at least one of lengthening the refresh interval and lowering the visibility when it is determined that the driver is drawn to the display unit, and in a case where it is determined that the driver gazes at the display unit, performing at least one of lengthening the refresh interval and lowering the visibility as compared to a case where it is determined that the driver is drawn to the display unit. In this display system, the information displayed on the display unit is prevented from attracting the attention of the driver both when the driver is attracted to the display unit and when the driver is gazing at the display unit. Further, in a case where it is determined that the driver gazes at the display unit, at least one of lengthening the refresh interval and lowering the visibility is executed as compared with a case where it is determined that the driver is drawn to the display unit. In this manner, the display system can perform at least one of increasing the refresh interval in a stepwise manner and decreasing the visibility in a stepwise manner in accordance with the state of the driver.

In one embodiment, the control unit may include determining whether or not the driver is drawn to the display unit based on a detection result of the driver monitoring sensor when the vehicle travels in the basic driving mode, lowering the visibility when it is determined that the driver is drawn to the display unit, and in a case where it is determined that the driver gazes at the display unit, lowering the visibility in a manner different from a case where it is determined that the driver is drawn to the display unit. The visibility may be reduced by, for example, reducing brightness, reducing saturation, reducing contrast, or adding blurring. This display system can reduce visibility by distinguishing between a case where the driver is gazing at the display unit and a case where the driver is being attracted to the display unit.

In one embodiment, the control unit may include, in a case where it is determined that the driver who gazes at the display unit no longer gazes at the display unit, determining a timing at which at least one of the refresh interval and the visibility is returned based on a period during which the driver gazes. In this case, the display system can return at least one of refresh interval and visibility at a timing corresponding to a period during which the driver gazes.

According to the disclosure, there is provided a technique for appropriately suppressing the frequency at which the driver views the display unit in a case where the degree of autonomy of the driving task decreases due to a change in the driving mode as compared to before the driving mode change.

BRIEF DESCRIPTION OF THE DRAWINGS

FIG. 5 is a graph showing the relationship between the degree of autonomy of the driving task and the refresh interval.

FIG. 9 is a graph showing the relationship between the degree of autonomy of a driving task and the level of visibility.

DETAILED DESCRIPTION

Hereinafter, embodiments of the present disclosure will be described with reference to the drawings.

Figure 1:
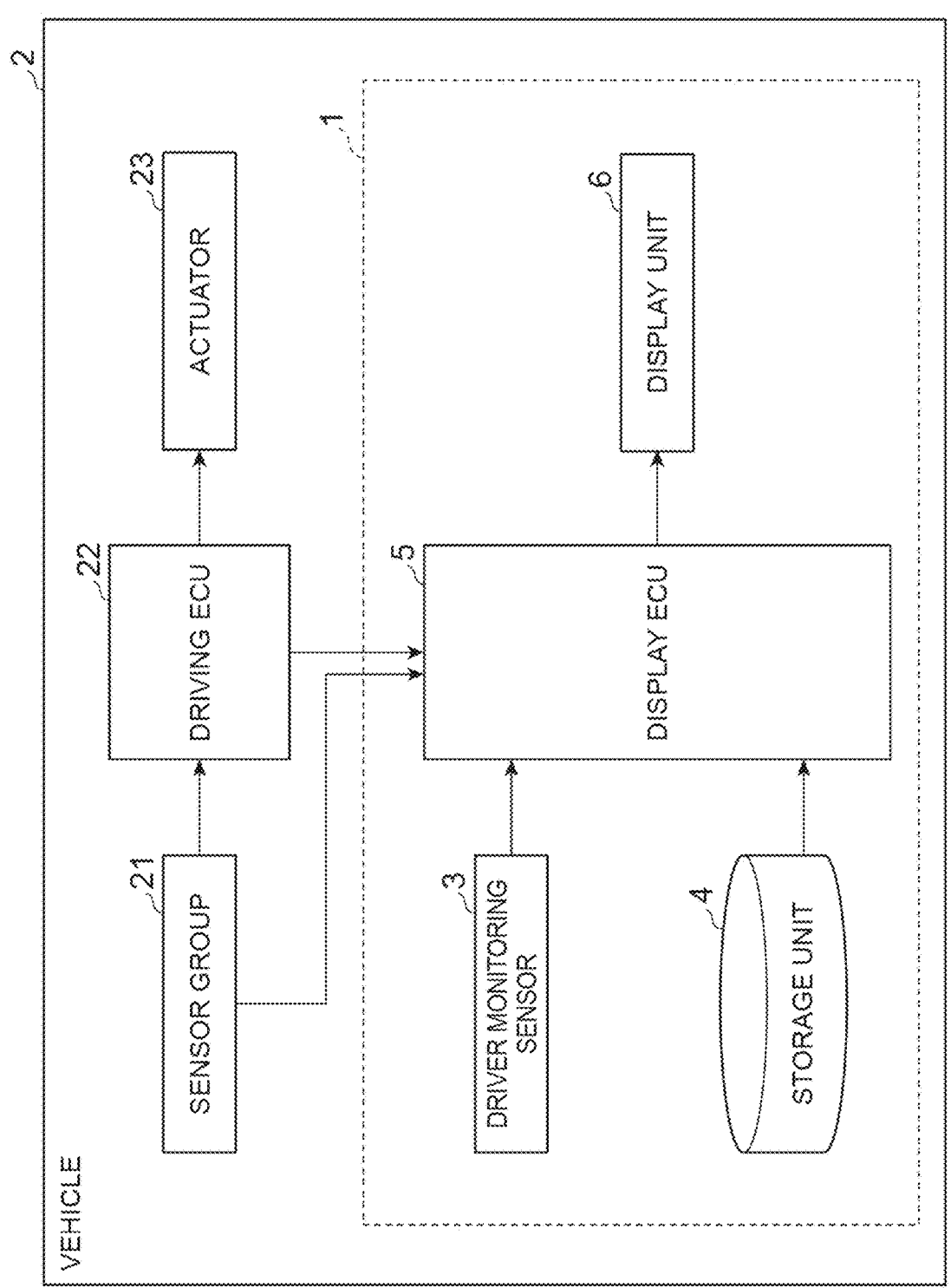
FIG. 1 is a block diagram illustrating an example of a configuration of a vehicle including a display system according to an embodiment.

[Configuration of Vehicle] FIG. 1 is a block diagram illustrating an example of a configuration of a vehicle including a display system according to an embodiment. As shown in FIG. 1, a display system 1 is mounted on a vehicle 2 as an example. The vehicle 2 is, for example, a car that travels in a driving mode selected from a plurality of driving modes having different degrees of autonomy of driving tasks.

The degree of autonomy of the driving task is an index that defines the driving task autonomously performed by the vehicle system. As the degree of autonomy of the driving task increases, the number or type of driving tasks autonomously performed by the vehicle system increases. Alternatively, as the degree of autonomy of the driving task increases, the range in which the vehicle system autonomously performs a certain driving task increases. Examples of the driving task include brake operation, accelerator operation, and handle operation, as well as lane maintenance, inter-vehicle distance control, start, stop, lane change, right or left turn, collision suppression, parking, and the like that are realized by these operations.

The degree of autonomy of the driving task may be a level of general autonomous driving. The level of autonomous driving may be as defined by SAE (Society of Automotive Engineers, Inc.). For example, when the degree of autonomy of the driving task is 0, it means that the vehicle system does not intervene in driving, and manual driving is performed (level 0). When the degree of autonomy of the driving task is 1 or 2, it means that the driving operation including brake operation, accelerator operation, and handle operation is partially autonomously performed (level 1 or 2). When the degree of autonomy of the driving task is 3 or 4, it means a state in which all of the driving tasks are autonomously performed on condition that a preset travel condition is satisfied (level 3 or 4). When the degree of autonomy of the driving task is 5, this means a state in which all of the driving tasks are autonomously performed without setting conditions (level 5). Hereinafter, a method of driving at the degree of autonomy of the driving task described above is referred to as a driving mode. The driving modes include, for example, a manual driving mode in which the degree of autonomy of the driving task is 0, a first driving mode in which the degree of autonomy of the driving task is 1, a second driving mode in which the degree of autonomy of the driving task is 2, a third driving mode in which the degree of autonomy of the driving task is 3, a fourth driving mode in which the degree of autonomy of the driving task is 4, and a fifth driving mode in which the degree of autonomy of the driving task is 5.

The vehicle 2 is capable of traveling in at least two driving modes. The plurality of driving modes are two or more driving modes in which the degree of autonomy of the operation task is arbitrarily selected from 0 to 5. For example, the vehicle 2 may be vehicles that can travel in two driving modes in which the degree of autonomy of the driving task is 0 and 1. The number of driving modes is not particularly limited as long as it is two or more. For example, the vehicle 2 may be vehicles that can travel in six driving modes in which the degree of autonomy of the driving task is 0 to 5. The vehicle 2 does not necessarily have to be able to travel in a driving mode in which the degree of autonomy of the driving task is 0. For example, the vehicle 2 may be an autonomous driving vehicle capable of traveling in two driving modes in which the degree of autonomy of the driving task is 3 and 5.

The vehicle 2 includes a driving ECU 22 for executing a plurality of driving modes having different degrees of autonomy of driving tasks. The electronic control unit (ECU) includes a central processing unit (CPU), a read only memory (ROM), a random-access memory (RAM), and a controller area network (CAN). The electronic control unit includes a communication circuit and the like. The driving mode in which the degree of autonomy of the driving task is equal to or greater than 1 is realized by the driving ECU operating an actuator 23 of the vehicle 2 based on at least the detection result of a sensor group 21.

The sensor group 21 includes, for example, a sensor that detects a driving operation by a driver, a sensor that detects a surrounding environment of the vehicle 2, and a sensor that detects a travel state of the vehicle 2. The sensor that detects the driving operation by the driver includes, for example, a brake pedal sensor, an accelerator pedal sensor, and a steering wheel operation sensor. The sensor that detects the surrounding environment of the vehicle 2 includes, for example, at least one of a camera and a radar sensor. The sensors for detecting the travel state of the vehicle 2 may include, for example, a global positioning system (GPS) receiver, a vehicle speed sensor, an acceleration sensor, and a yaw rate sensor. The sensor group 21 may include sensors that detect information about the surrounding environment of the vehicle 2 or information about the state of the vehicle 2, such as an air temperature sensor that detects an outside air temperature, a sensor that meters fuel, and a water temperature sensor that cools water.

The actuator 23 is a device used for travel control of the vehicle 2. The actuator 23 includes at least a drive actuator, a brake actuator, and a steering actuator.

[Configuration of Display System] The display system 1 includes, for example, a driver monitoring sensor 3, a storage unit 4, a display ECU 5 (an example of a control unit), and a display unit 6. The driver monitoring sensor 3 is configured to detect a reaction of the driver. The driver monitoring sensor 3 is, for example, a camera that captures an image of the driver. The line of sight of the driver is detected based on the detection result of the driver monitoring sensor 3. The storage unit 4 is a storage device that stores information necessary for the display ECU 5 control. The display unit 6 is a device that displays information to the driver, and is a display as an example.

The display ECU 5 is connected to the driver monitoring sensor 3, the storage unit 4, and the display unit 6. The display ECU 5 is an electronic control unit including a CPU, a ROM, a RAM, a CAN communication circuit, and the like. The display ECU 5 may be an ECU in which a plurality of ECUs is integrated. The display ECU 5 displays information based on the detection result of the sensor group 21 on the display unit 6. The display ECU 5 is connected to the sensor group 21 and obtains the detection result of the sensor group 21 directly from the sensor group 21. The display ECU 5 may be connected to the operation ECU 22 and indirectly acquire the detection result of the sensor group 21 through the operation ECU 22.

Figure 2:
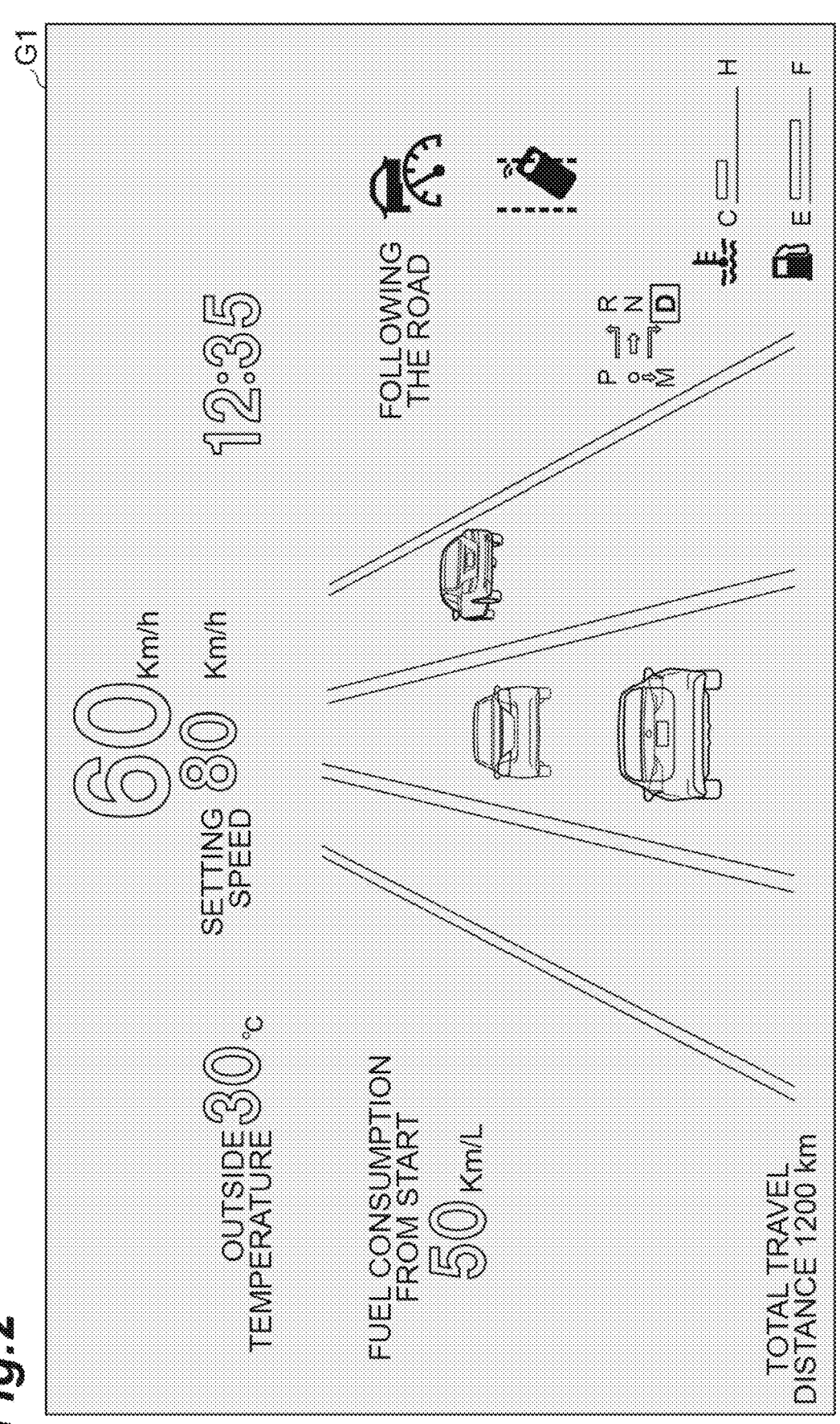
FIG. 2 is an example of a screen of the display unit.

FIG. 2 is an example of a screen of the display unit. As shown in FIG. 2, the display ECU 5 displays information based on the detection result of the sensor group 21 on the display unit 6. A plurality of pieces of information are displayed on a screen G1 of the display unit 6. The display ECU 5 updates (refreshes) the information displayed on the screen G1 at predetermined intervals. The display ECU 5 constitutes the screen G1, for example, by superposing a plurality of layers. Each of the layers includes one or more representations. The display ECU 5 can easily update the information displayed on the screen G1 by updating the display for each layer.

FIGS. 3A and 3B and FIGS. 4A and 4B are examples of layers of the screen of the display unit. The screen G1 shown in FIG. 2 includes, for example, four layers of a first layer L1 shown in FIG. 3A, a second layer L2 shown in FIG. 3B, a third layer L3 shown in FIG. 4A, and a fourth layer L4 shown in FIG. 4B. The display included in each layer, the number of layers, and the like are examples and are not limited thereto.

Figure 3A:
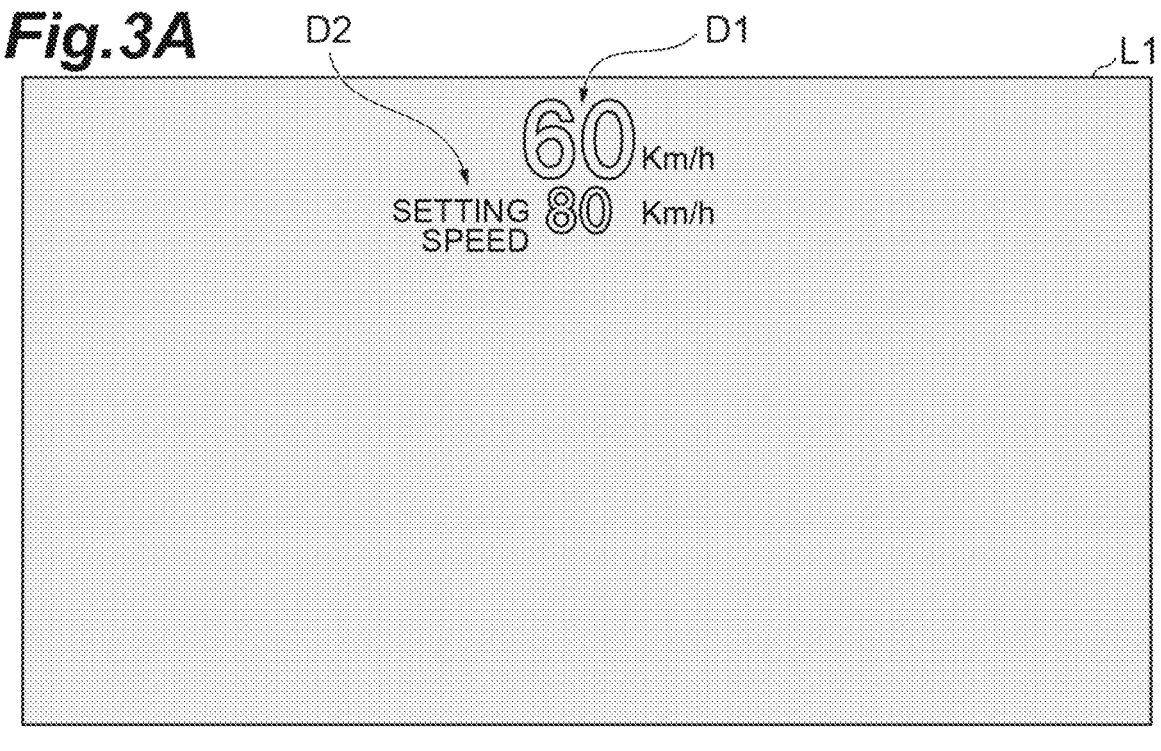
FIG. 3A is an example of a layer of the screen of the display unit.

As shown in FIG. 3A, the first layer L1 includes a speed display D1 and a setting speed display D2. The speed display D1 indicates a current vehicle speed which is a detection result of the sensor group 21. The speed display D1 may be mandated to be displayed by law. The setting speed display D2 indicates a setting speed of the inter-vehicle distance control performed by the driving ECU 22.

Figure 3B:
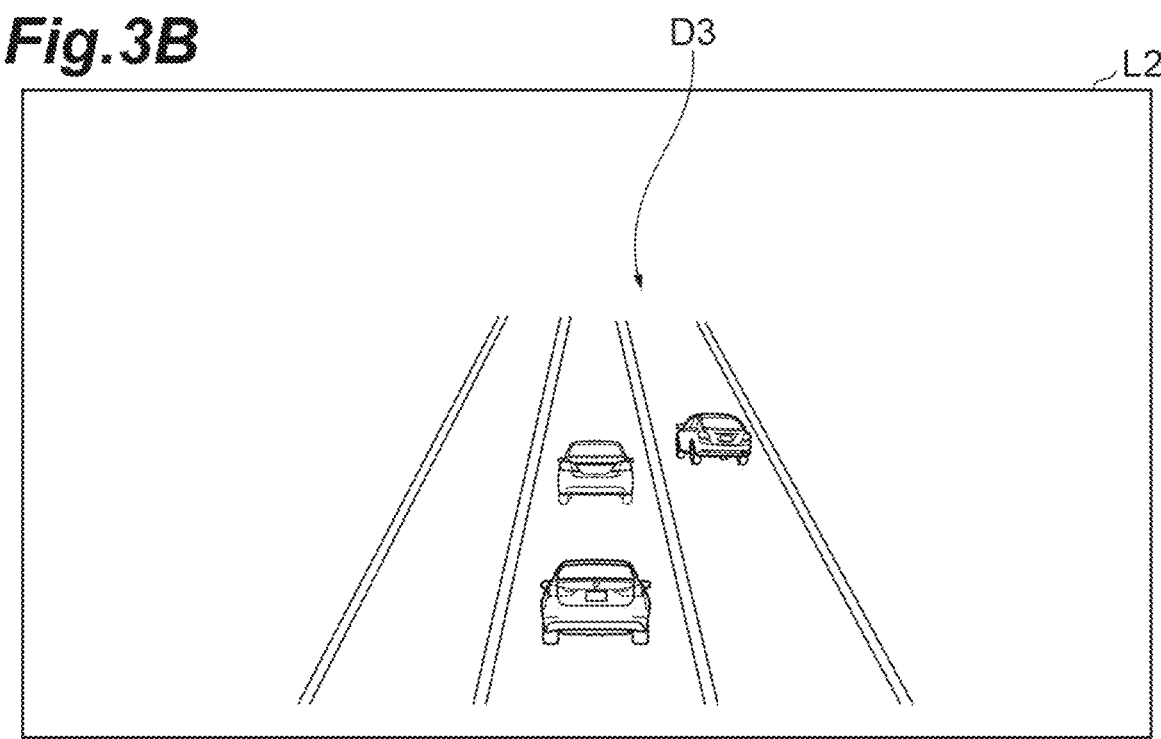
FIG. 3B is another example of a layer of the screen of the display unit.

As shown in FIG. 3B, the second layer L2 includes a peripheral display D3. The peripheral display D3 is a pattern diagram generated based on the detection result of the sensor group 21, and indicates vehicles present around the vehicle 2.

Figure 4A:
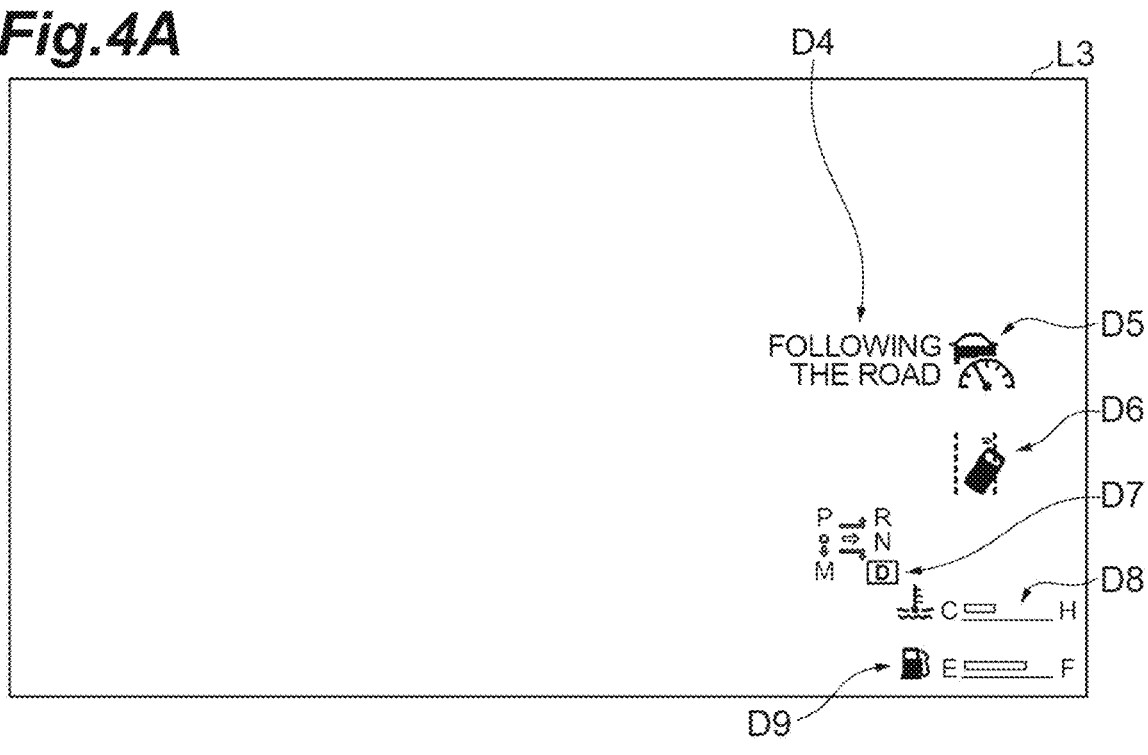
FIG. 4A is an example of a layer of the screen of the display unit.

As illustrated in FIG. 4A, the third layer L3 includes a navigation information display D4, an inter-vehicle distance control ON display D5, a lane maintenance control ON display D6, a shift position display D7, a water temperature display D8, and a fuel remaining amount display D9. The navigation information display D4 indicates guidance information acquired from navigation systems (not shown). The inter-vehicle distance control ON display D5 indicates that the inter-vehicle distance control performed by the driving ECU 22 is in an ON state. The lane maintenance control ON display D6 indicates that the lane maintenance control performed by the operation ECU 22 is in the ON state. The shift position display D7 indicates the current shift position. The water temperature display D8 indicates the temperature of the engine cooling water. The fuel remaining amount display D9 indicates the remaining amount of fuel.

Figure 4B:
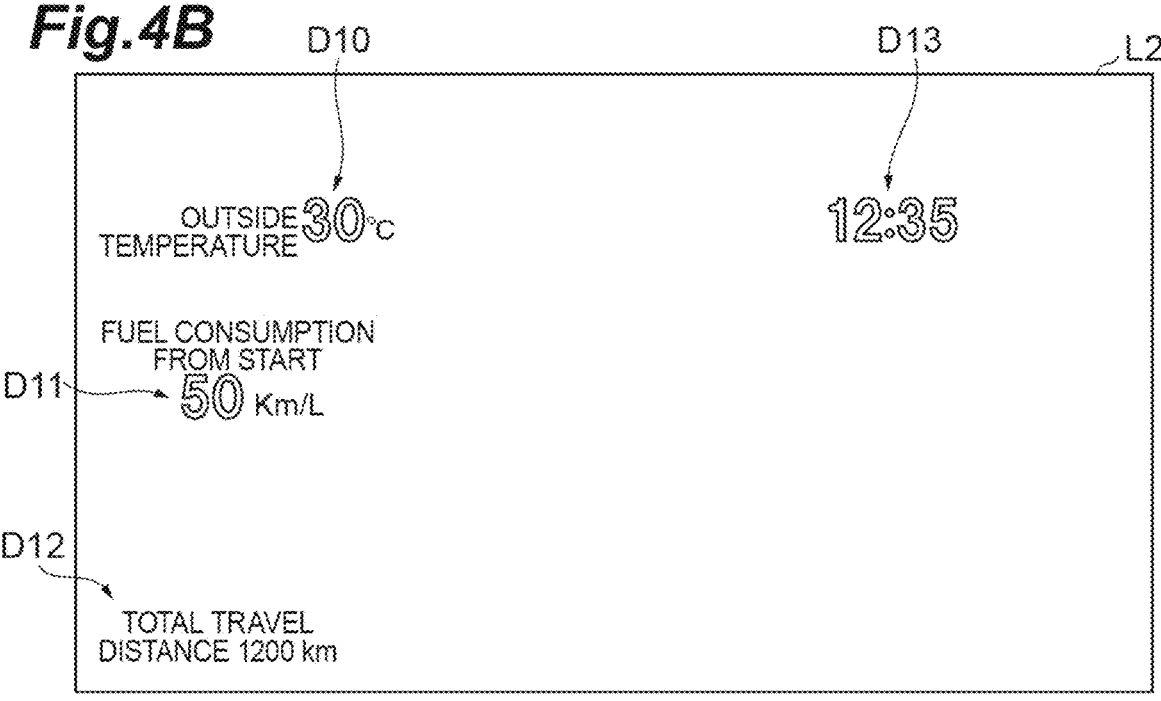
FIG. 4B is another example of a layer of the screen of the display unit.

As shown in FIG. 4B, the fourth layer L4 includes an outside air temperature display D10, a fuel consumption display D11, a travel distance display D12, and a clock display D13. The outside air temperature display D10 indicates the temperature of the outside air of the vehicle 2. The fuel consumption display D11 indicates the fuel consumption measured from the ignition ON. The travel distance display D12 indicates the total mileage of the vehicle 2. The clock display D13 indicates the current time.

The display ECU 5 acquires information from at least one of the sensor group 21 and the driving ECU 22, and updates the display included in the first layer L1 to the fourth layer L4. The display ECU 5 may set a refresh interval for each layer. For example, the refresh interval of the first layer L1 and the second layer L2 may be set to 50 ms (millisecond), the refresh interval of the third layer L3 may be set to 200 ms, and the refresh interval of the fourth layer L4 may be set to 800 ms. Thus, the speed display D1, the setting speed display D2, and the peripheral display D3 displayed on the screen G1 of the display unit 6 are updated every 50 ms. Similarly, the navigation information display D4, inter-vehicle distance control ON display D5, lane maintenance control ON display D6, the shift position display D7, the water temperature display D8, and the fuel remaining amount display D9 displayed on the screen G1 of the display unit 6 are updated every 200 ms. The outside air temperature display D10, the fuel consumption display D11, the travel distance display D12, and the clock display D13 are updated every 800 ms.

When the degree of autonomy is reduced by the change of the driving mode compared to before the driving mode change, the display ECU 5 performs at least one of lengthening a refresh interval of the predetermined information displayed on the display unit 6 compared to before the driving mode change and reducing visibility of the predetermined information compared to before the driving mode change. Details of the operation will be described below.

The display ECU 5 determines that the degree of autonomy has decreased due to the driving mode change compared to before the driving mode change. For example, the display ECU 5 acquires information about the running driving mode from the driving ECU 22 and stores the information in the storage unit 4. Subsequently, the display ECU 5 further acquires information related to the running driving mode from the driving ECU 22, and compares the degree of autonomy related to the acquired driving mode (current degree of autonomy) with the degree of autonomy related to the driving mode stored in the storage unit 4 (degree of autonomy at the time of previous acquisition).

In a case where the current degree of autonomy is lower than the degree of autonomy at the time of previous acquisition, the display ECU 5 determines that the degree of autonomy has decreased due to the driving mode change compared to before the driving mode change. In this way, the case where the degree of autonomy is reduced by the change of the driving mode compared to before the driving mode change means a case where the driving mode is changed to a driving mode having a degree of autonomy lower than that of the current driving mode. For example, the degree of autonomy of the current driving mode is 2, and the degree of autonomy of the driving mode after the change is 1. For example, the degree of autonomy of the current driving mode is 3, and the degree of autonomy of the driving mode after the change is 0.

The determination that the degree of autonomy has decreased may be performed by the driving ECU 22. The display ECU 5 may acquire from the driving ECU 22 that the degree of autonomy has decreased due to the driving mode change compared to before the driving mode change.

When the degree of autonomy decreases, the display ECU 5 performs at least one of the following two operations. The action of the first is to make the refresh interval of the predetermined information displayed on the display unit 6 longer than before the driving mode change. The predetermined information displayed on the display unit 6 is information selected from the information displayed on the display unit 6. The predetermined information may be, for example, information related to the surrounding situation of the vehicle 2 (an example of information that moves and is likely to attract eyes). The predetermined information may be information that is not mandatory to be displayed by law. The predetermined category of information is stored, for example, in the storage unit 4.

In the display ECU 5, a refresh interval of a layer in which predetermined information is displayed is made longer than that before the driving mode change. For example, it is assumed that the predetermined information is the peripheral display D3 and the refresh interval before the driving mode change of the second layer L2 including the peripheral display D3 is 50 ms. The display ECU 5 changes the refresh interval of the second layer L2 including the peripheral display D3 from 50 ms to, for example, 200 ms when the degree of autonomy decreases. Thus, since the peripheral display D3 updated at intervals of 50 ms in the screen G1 of the display unit 6 is updated at intervals of 200 ms, the continuous change of the peripheral display D3 is suppressed while maintaining the display mode of other information, and visual stimulation to the driver is reduced. Therefore, it is possible to prevent the peripheral display D3 from attracting the attention of the driver.

Figure 5:
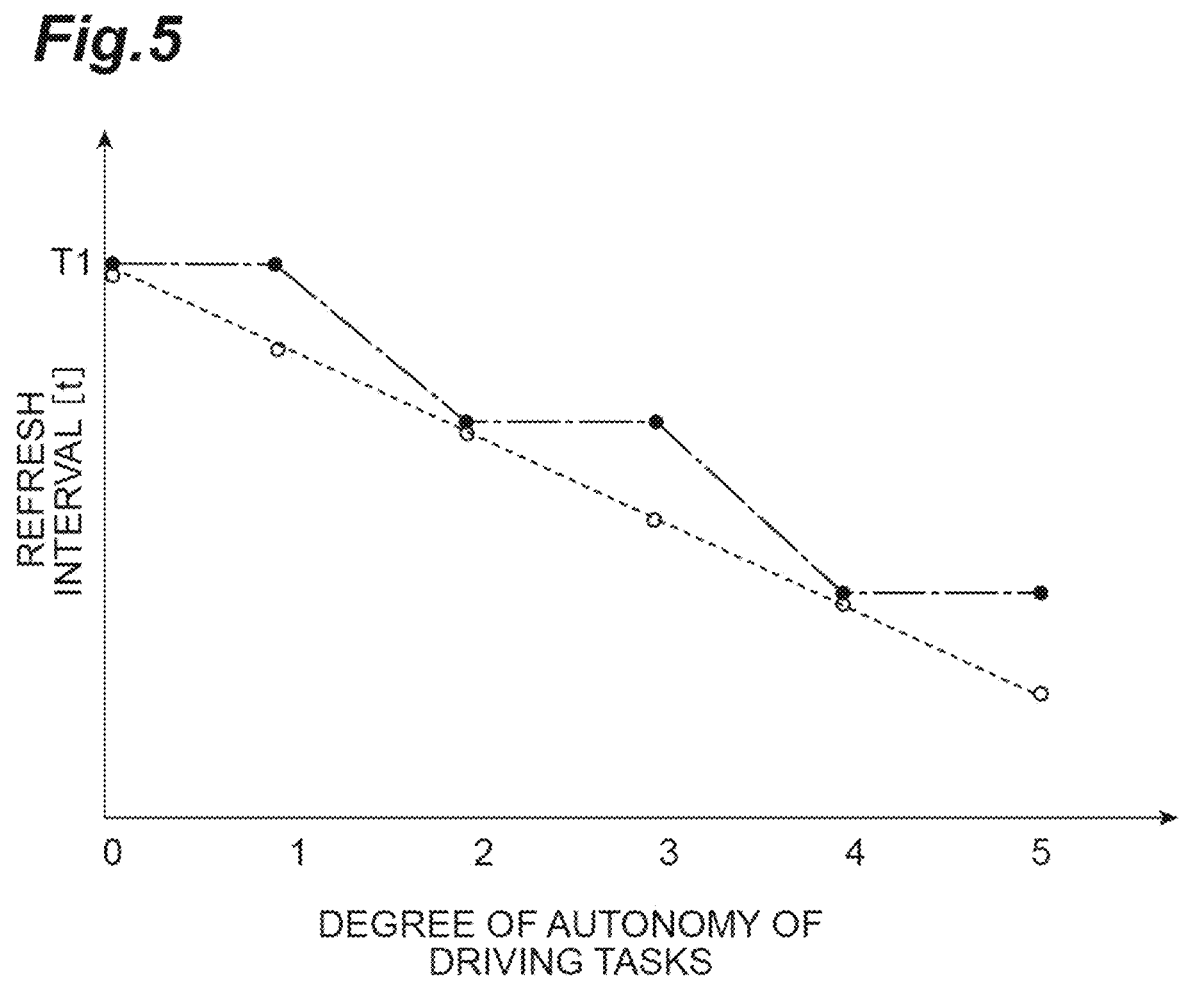

FIG. 5 is a graph showing the relationship between the degree of autonomy of the driving task and the refresh interval. The horizontal axis represents the degree of autonomy of the driving task, and the vertical axis represents the refresh interval of the information. A refresh interval at the time of manual driving (degree of autonomy 0) is set to T1. As indicated by data points of white circles in FIG. 5, the refresh interval is set to be longer as the degree of autonomy of the driving task becomes smaller. Alternatively, as indicated by data points of black circles in FIG. 5, the refresh interval may be set to be longer in a stepwise manner as the degree of autonomy of the driving task becomes smaller. The relationship shown in FIG. 5 is stored in advance in the storage unit 4. The display ECU 5 can determine the refresh interval according to the degree of autonomy with reference to the storage unit 4. Note that the graph shown in FIG. 5 may be provided for each layer. In this case, the display ECU 5 can control a change in refresh interval for each layer.

The action of the second is to lower the visibility of the predetermined information displayed on the display unit 6 than before the driving mode change. Examples of reducing visibility include, for example, reducing brightness, reducing saturation, reducing contrast, and adding blurring. The display ECU 5 reduces the visibility of a layer in which predetermined information is displayed compared to that before the driving mode change. For example, it is assumed that the predetermined information is the peripheral display D3. The display ECU 5 may add blurring to the second layer L2 that includes the peripheral display D3 when the degree of autonomy decreases.

Figure 6A:
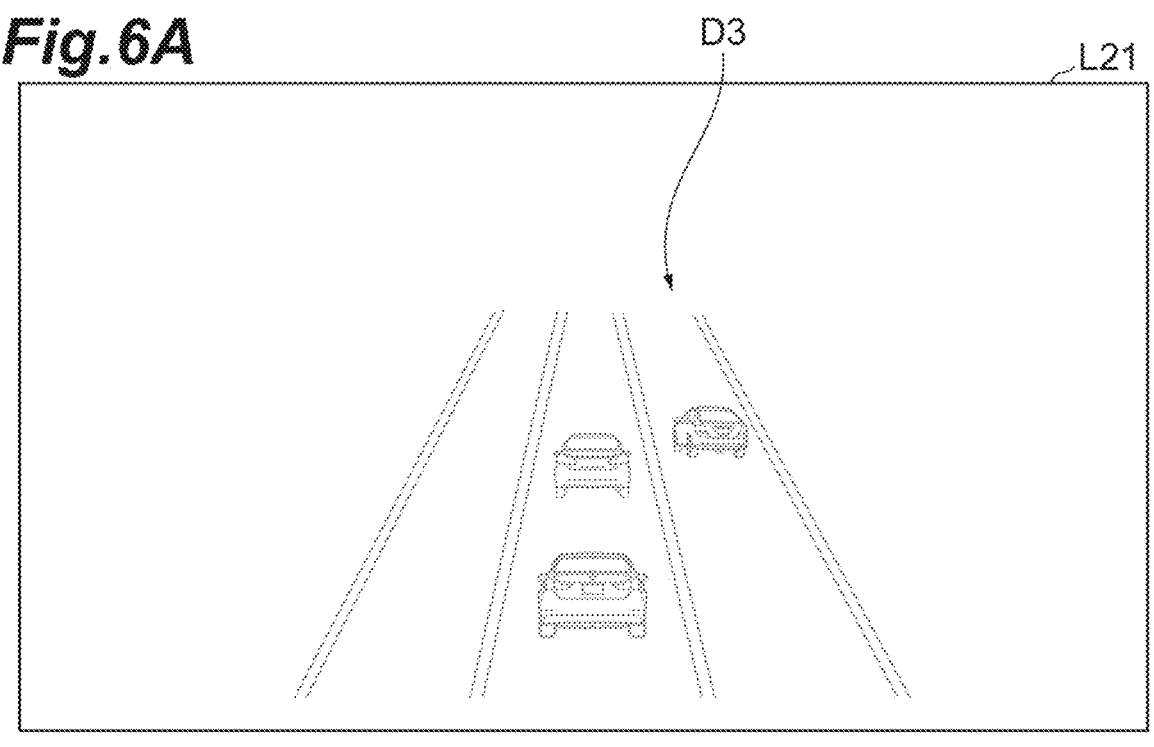
FIG. 6A is an example of a layer in which visibility of information is reduced.
Figure 6B:
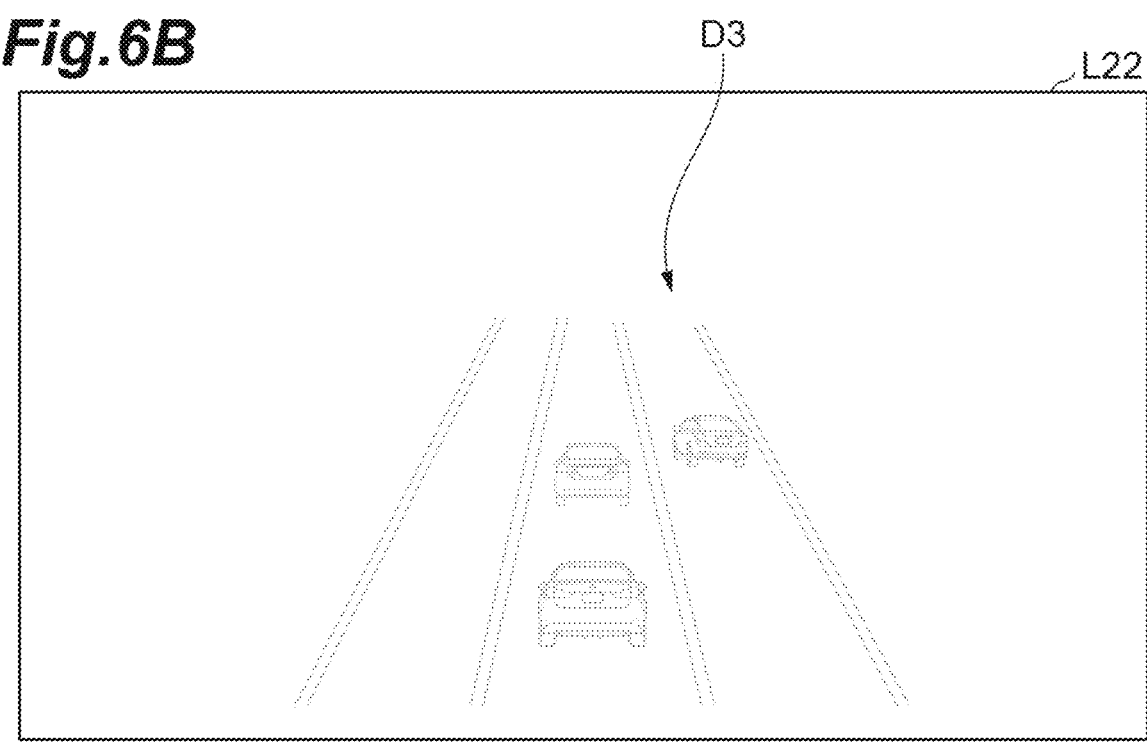
FIG. 6B is another example of a layer in which visibility of information is reduced.

FIGS. 6A and 6B are examples of layers in which visibility of information is reduced. As shown in FIG. 6A, blurring (40% transparency) is applied to the entire second layer L2 to form the second layer L21. In the second layer L21, the peripheral display D3 is hardly visible. When the degree of autonomy further decreases, as illustrated in FIG. 6B, a further strong blurring (transparency 10%) is applied to the entire second layer L2, and the second layer L22 is obtained. In the second layer L22, the peripheral display D3 is more difficult to see.

Figure 7A:
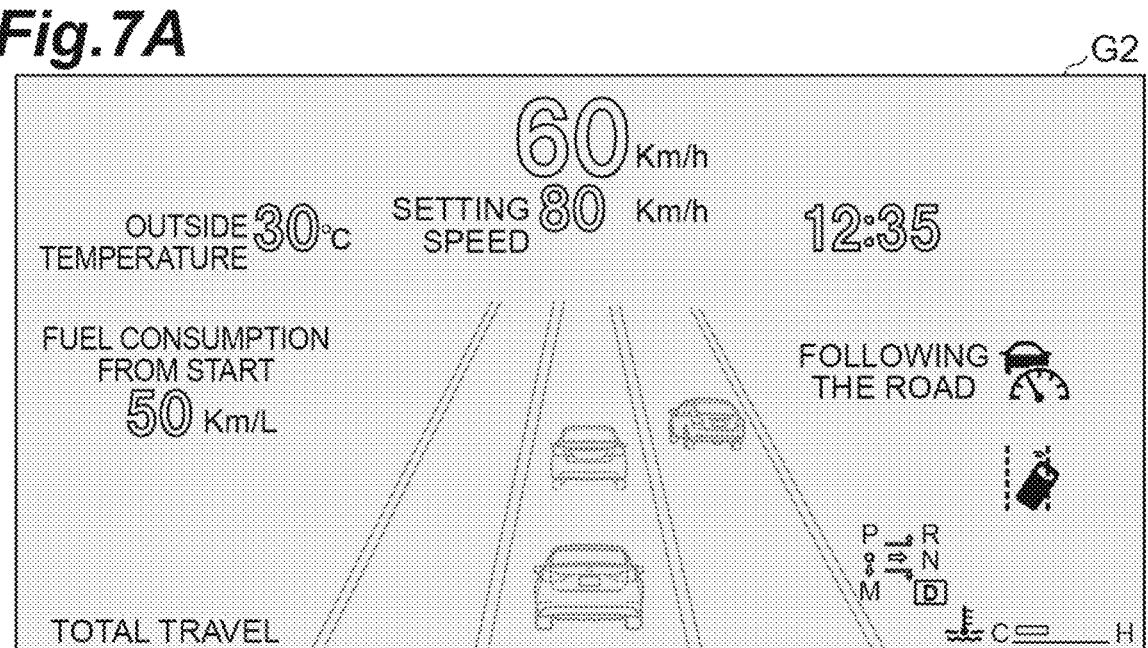
FIG. 7A is an example of a screen in which the visibility of information is reduced.
Figure 7B:
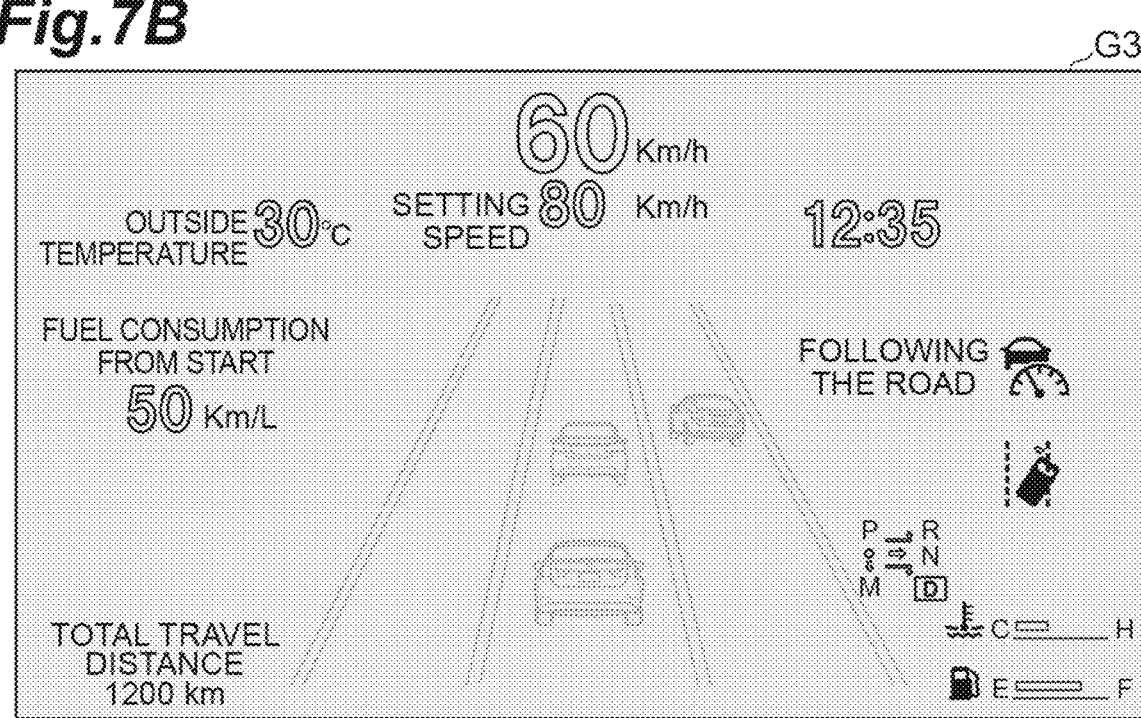
FIG. 7B is another example of a screen in which the visibility of information is reduced.

FIGS. 7A and 7B are examples of screens in which the visibility of information is reduced. A screen G2 in FIG. 7A is a screen configured using the second layer L21 in FIG. 6A. As illustrated in FIG. 7A, the peripheral display D3 is presented to the driver in a state in which it is difficult to see the pedestrian. A screen G3 in FIG. 7B is a screen configured by using the second layer L22 in FIG. 6B. As shown in FIG. 7B, the peripheral display D3 is presented to the driver in a state in which it is even more difficult to see. By changing to a state in which the peripheral display D3 is difficult to see on the screen, it is possible to suppress the peripheral display D3 from attracting the attention of the driver while maintaining the display mode of other information.

The display for which visibility is reduced is not limited to the peripheral display D3. For example, the visibility of the display regarding the fourth layer L4 may be reduced.

Figure 8A:
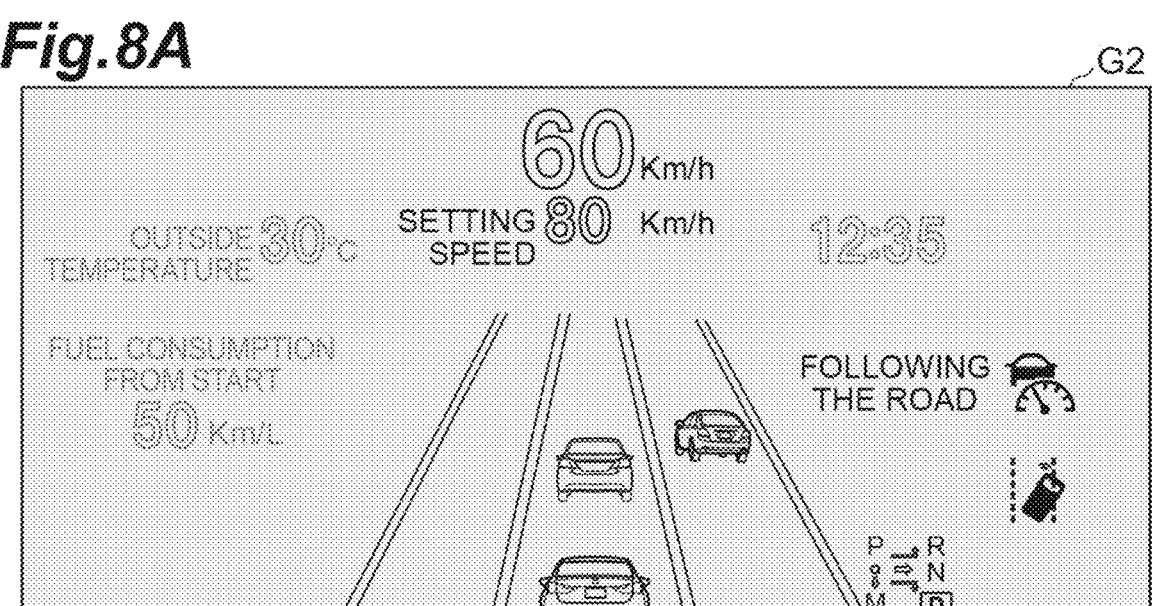
FIG. 8A is another example of a screen in which the visibility of information is reduced.
Figure 8B:
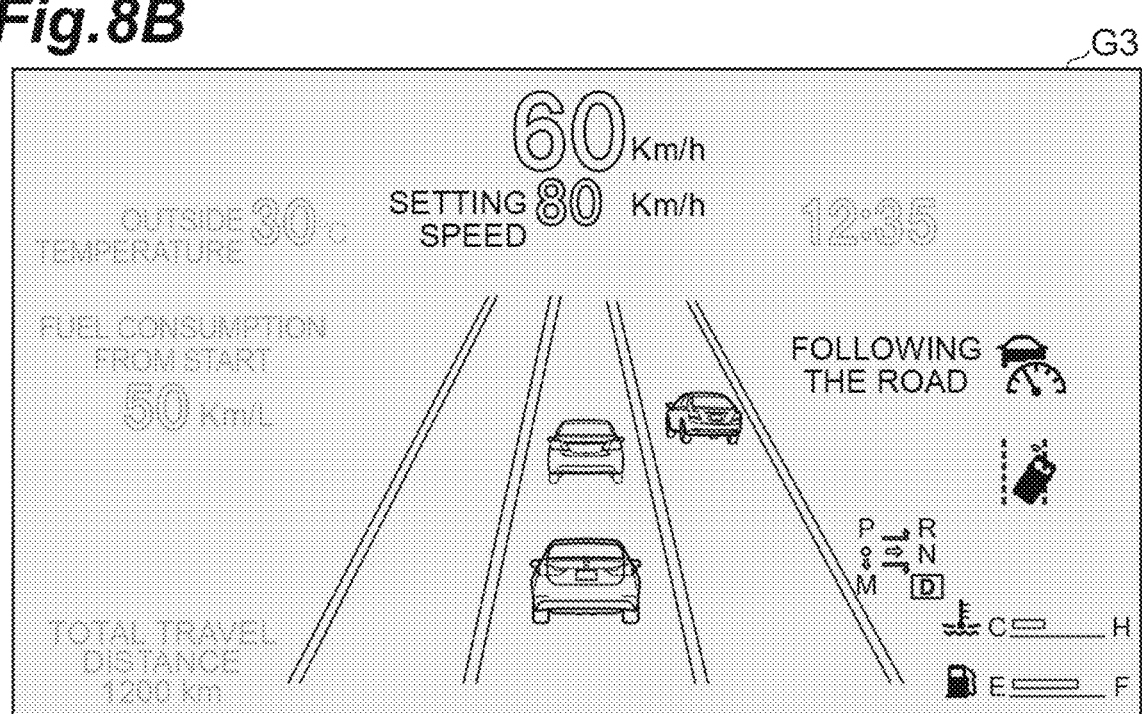
FIG. 8B is still another example of a screen in which the visibility of information is reduced.

FIGS. 8A and 8B show other examples of screens in which the visibility of information is reduced. A screen G4 in FIG. 8A is a screen formed by adding blurring to the fourth layer L4 in FIG. 4B. As illustrated in FIG. 8A, the outside air temperature display D10, the fuel consumption display D11, the travel distance display D12, and the clock display D13 are presented to the driver in a state in which they are difficult to see. A screen G5 in FIG. 8B is a screen configured by further adding a strong blur to the fourth layer L4 in FIG. 4B. As shown in FIG. 8B, the outside air temperature display D10, the fuel consumption display D11, the travel distance display D12, and the clock display D13 are presented to the driver in a state in which they are more difficult to see.

Figure 9:
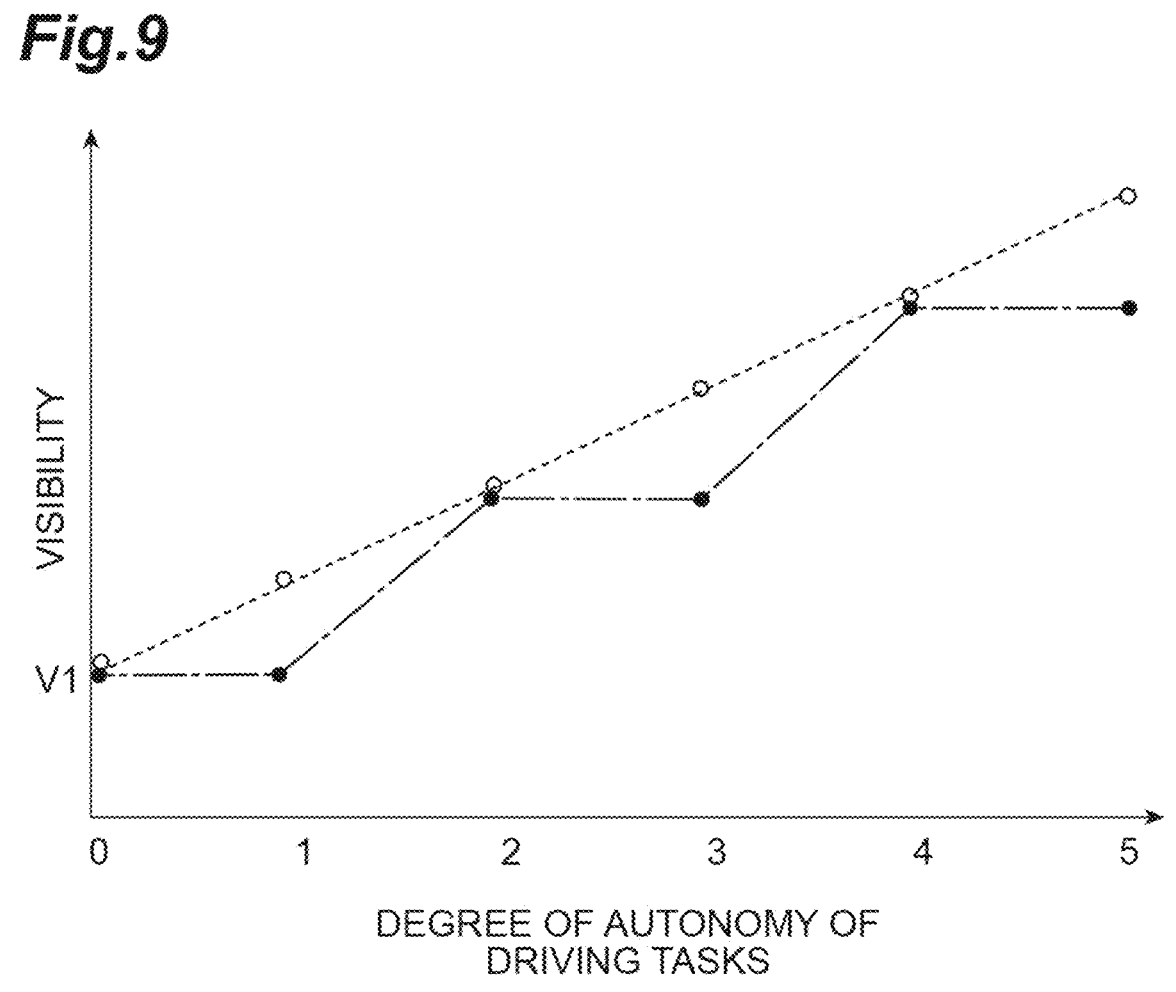

FIG. 9 is a graph showing the relationship between the degree of autonomy of a driving task and the level of visibility. The horizontal axis represents the degree of autonomy of the driving task, and the vertical axis represents the visibility level. The level of visibility during manual driving (degree of autonomy 0) is defined as V1. As indicated by data points of white circles in FIG. 9, the visibility is set to be lower as the degree of autonomy of the driving task becomes smaller. Alternatively, as indicated by data points of black circles in FIG. 9, the visibility may be set to be gradually lower as the degree of autonomy of the driving task becomes smaller. The relationship shown in FIG. 9 is stored in advance in the storage unit 4. The display ECU 5 can refer to the storage unit 4 to determine visibility as a function of degree of autonomy. Note that the graph shown in FIG. 9 may be provided for each layer. In this case, the display ECU 5 can control a change in visibility for each layer.

The display ECU 5 can also change both refresh interval and visibility. In this case, it is possible to further suppress the predetermined information from attracting the attention of the driver.

The display ECU 5 may determine at least one of a timing (first reflection timing) at which the refresh interval is made longer than before the driving mode change and a timing (second reflection timing) at which the visibility is made lower than before the driving mode change, in accordance with a difference in degree of autonomy before and after the driving mode change. For example, when the degree of autonomy before the driving mode change is 4 and the degree of autonomy after the driving mode change is 3, the difference between the degrees of autonomy before and after the driving mode change is 1. For example, when the degree of autonomy before the driving mode change is 3 and the degree of autonomy after the driving mode change is 0, the difference between the degrees of autonomy before and after the driving mode change is 3.

The first reflection timing and the initial value of the second reflection timing are stored in advance in the storage unit 4. In the display ECU 5, for example, at least one of the first reflection timing and the second reflection timing is set to be shorter than the initial value as the difference between the degrees of autonomy before and after the driving mode change is larger. As a result, when the degree of autonomy is greatly reduced due to the driving mode change, it is possible to immediately draw the driver's attention to the surroundings of the vehicle.

[Operation in Consideration of line of Sight of Driver] In a case where the driving mode of the vehicle 2 is a driving mode (an example of a basic driving mode) in which the driver performs all or a part of the driving task, the driver needs to monitor the surroundings of the vehicle 2 more carefully and needs to avoid being drawn by the display unit 6 or gazing at the display unit 6. The attraction is a state in which the frequency of visual observation is high in a predetermined period, and the gazing is a state in which visual observation is performed for a predetermined time or more. The basic driving mode is, for example, an driving mode corresponding to a degree of autonomy of 0 to 2.

When the vehicle 2 runs in the basic driving mode, the display ECU 5 determines whether or not the driver in the vehicle 2 is gazing at the display unit 6 based on the detection result of the driver monitoring sensor 3. The display ECU 5 detects the visual line direction of the driver from the detection result of the driver monitoring sensor 3, and determines whether or not the driver gazes at the display unit 6 based on the detected visual line direction, the position of the display unit 6, and the time when the position of the display unit 6 overlaps with the visual line direction.

When it is determined that the driver gazes at the display unit 6, the display ECU 5 performs at least one of lengthening the refresh interval and lowering the visibility. The display ECU 5 increases the refresh interval of the predetermined information, decreases the visibility of the predetermined information, or performs both of them, similarly to the above-described method. In a case where it is determined that the driver gazes at the display unit 6, it can be expected that the attention of the vehicle 2 to the surrounding environment is reduced. The display ECU 5 may prompt the driver gazing at the display unit 6 to direct attention to the surrounding environment of the vehicle 2.

The display ECU 5 may change the display of the display unit 6 when there is not only a driver who is gazing but also a driver who is being attracted.

When the vehicle 2 runs in the basic driving mode, the display ECU 5 determines whether or not the driver in the vehicle 2 is induced to the display unit 6 based on the detection result of the driver monitoring sensor 3. The display ECU 5 detects the visual line direction of the driver from the detection result of the driver monitoring sensor 3, and determines whether or not the driver is attracted to the display unit 6 based on the detected visual line direction, the position of the display unit 6, and the time when the position of the display unit 6 overlaps with the visual line direction.

In a case where it is determined that the driver is attracted to the display unit 6, the display ECU 5 performs at least one of lengthening the refresh interval and lowering the visibility. The display ECU 5 increases the refresh interval of the predetermined information, decreases the visibility of the predetermined information, or performs both of them, similarly to the above-described method. When it is determined that the driver is drawn to the display unit 6, it can be expected that the attention of the vehicle 2 to the surrounding environment is reduced. The display ECU 5 may prompt the driver engaged in the display unit 6 to draw attention to the surrounding environment of the vehicle 2.

When the driver gazes at the display unit 6, it is more likely that the driver is immersed in the display unit 6 than when the driver is drawn to the display unit 6. Therefore, in a case where it is determined that the driver gazes at the display unit 6, the display ECU 5 may perform at least one of lengthening the refresh interval and lowering the visibility as compared to a case where it is determined that the driver is drawn to the display unit 6. As described above, the display ECU 5 can increase the refresh interval of the predetermined information, decrease the visibility of the predetermined information, or perform both of them in a stepwise manner according to the degree of immersion of the driver.

In a case where it is determined that the driver gazes at the display unit 6, the display ECU 5 may decrease the visibility in a manner different from a case where it is determined that the driver is drawn to the display unit 6. The visibility may be reduced by reducing brightness, reducing saturation, reducing contrast, adding blurring, or the like. For example, the display ECU 5 may lower the saturation of the prede- termined information when it is determined that the driver is drawn to the display unit 6, and may further lower the contrast of the predetermined information when it is deter- mined that the driver is gazing at the display unit 6. In this manner, the display ECU 5 can reduce the visibility of the predetermined information stepwise in accordance with the degree of immersion of the driver. In addition, by adopting different modes for attraction and gaze, it is possible to provide a range of changes in display, and thus it is possible to adopt a mode that is easy for the driver to understand.

When it is determined that the driver who gazes at the display unit 6 no longer gazes at the display unit 6, the display ECU 5 may determine a timing (return timing) at which at least one of the refresh interval and the visibility is returned based on a period during which the driver gazes. The initial value of the return timing is stored in advance in the storage unit 4. It can be expected that the longer the period during which the driver gazes, the greater the degree of immersion in the display unit 6. Therefore, the display ECU 5 sets the return timing to be longer than the initial value as the period during which the driver gazes is longer. As a result, the display ECU 5 can prevent the driver from starting to watch the display unit 6 immediately after direct- ing attention to the periphery of the vehicle 2.

Figure 10:
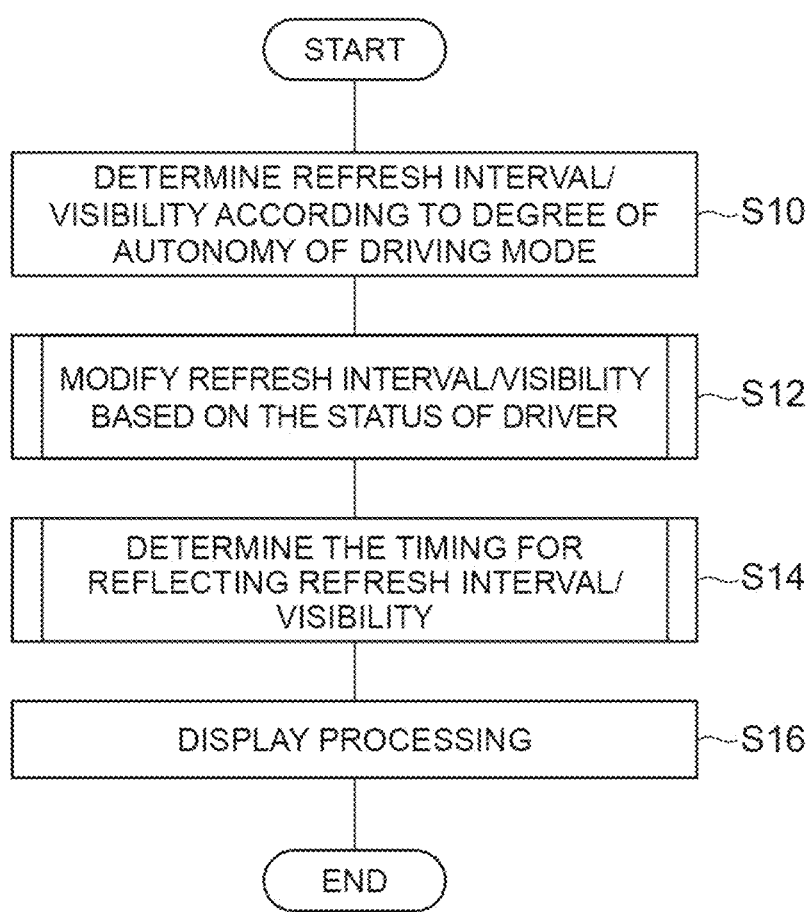
FIG. 10 is a flowchart showing an example of the operation of the display system.

[Operation of Display System] FIG. 10 is a flowchart showing the operation of the display system. The flowchart shown in FIG. 10 is started when the display system 1 receives a system start instruction operation.

As shown in FIG. 10, first, the display ECU 5 of the display system 1 determines refresh interval and/or visibility according to the degree of autonomy of the driving mode (step S10). The display ECU 5 determines the refresh interval and/or visibility corresponding to the degree of autonomy related to the current driving mode by using, for example, the graph showing the relationship between the degree of autonomy of the driving task and the refresh interval shown in FIG. 5 or the graph showing the relation- ship between the degree of autonomy of the driving task and the level of visibility shown in FIG. 9.

Figure 11:
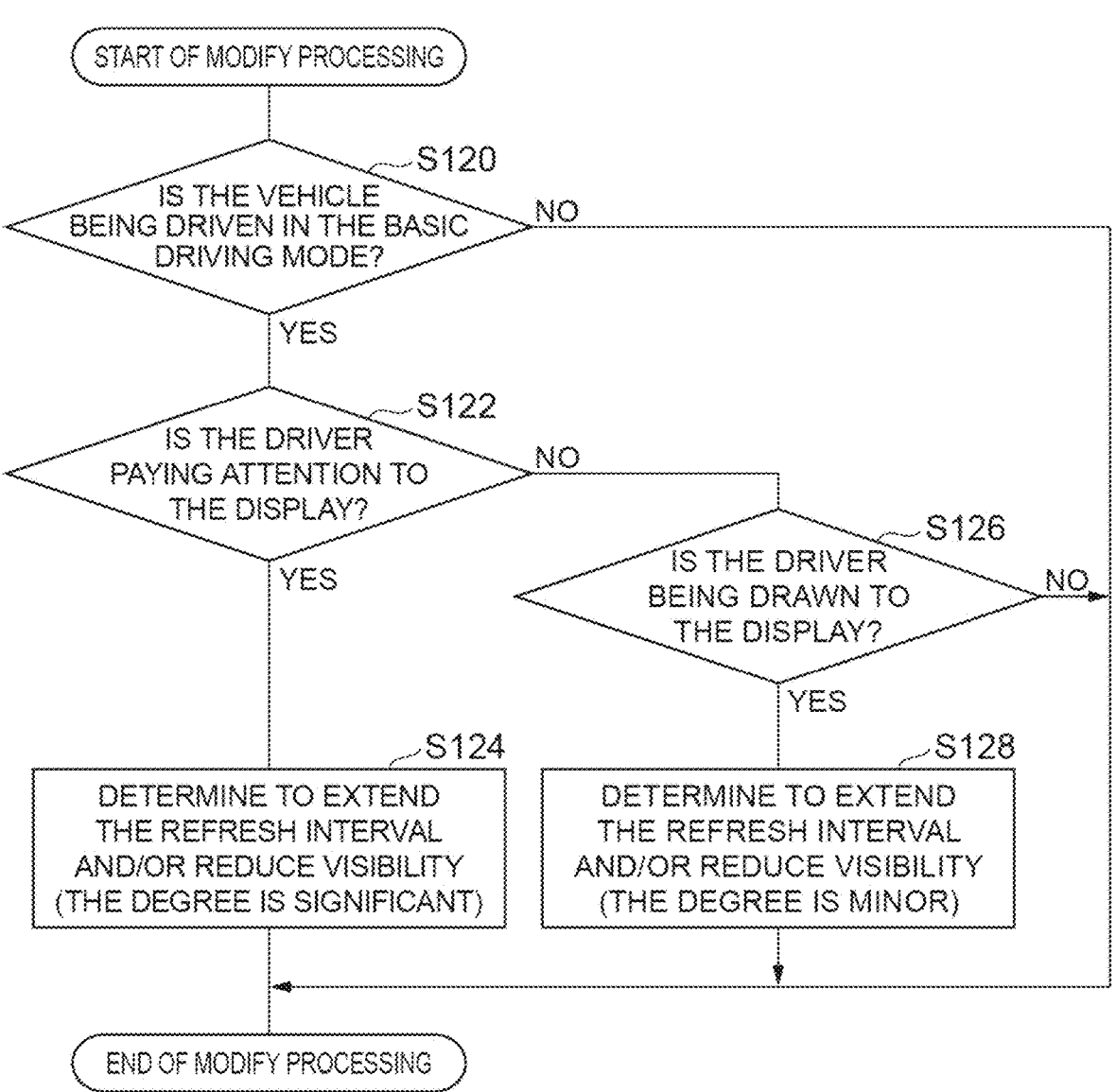
FIG. 11 is a flowchart illustrating an example of the modify processing.

Next, the display ECU 5 modifies the refresh interval and/or visibility according to the state of the driver (step S12). The details of the modification in step S12 are shown in FIG. 11. FIG. 11 is a flowchart illustrating an example of the modify processing.

As shown in FIG. 11, the display ECU 5 first determines whether the car is running in the basic driving mode (step S120). When the degree of autonomy related to the driving mode acquired from the driving ECU 22 is 0 to 2, the display ECU 5 determines that the car is traveling in the basic driving mode.

When it is determined that the vehicle 2 is traveling in the basic driving mode (step S120: YES), the display ECU 5 determines whether or not the driver is gazing at the display unit 6 (step S122). The display ECU 5 determines that the driver is gazing at the display unit 6 when the gaze direction of the driver and the position of the display unit 6 overlap each other for a threshold time or more based on the detection result of the driver monitoring sensor 3.

When it is determined that the driver gazes at the display unit 6 (step S122: YES), the display ECU 5 determines to increase the refresh interval and/or decrease the visibility (step S124). That is, the display ECU 5 determines that the refresh interval determined in step S10 in FIG. 10 is modi- fied to be longer and/or the visibility determined in step S10 in FIG. 10 is modified to be lower. The degree of modifi- cation of the step S124 (modification in the case of gazing) is set to be larger than the degree of modification of the step S128 (modification in the case of attraction) described later.

When it is determined that the driver is not gazing at the display unit 6 (step S122: NO), the display ECU 5 deter- mines whether or not the driver is attracted to the display unit 6 (step S126). The display ECU 5 determines that the driver is attracted to the display unit 6 when the number of times that the visual line direction of the driver and the position of the display unit 6 overlap with each other per unit time is equal to or more than a threshold based on the detection result of the driver monitoring sensor 3.

When it is determined that the driver is attracted to the display unit 6 (step S126: YES), the display ECU 5 deter- mines to increase the refresh interval and/or decrease the visibility (step S128). That is, the display ECU 5 determines that the refresh interval determined in step S10 in FIG. 10 is modified to be longer and/or the visibility determined in step S10 in FIG. 10 is modified to be lower. The degree of modification of the step S128 (modification in the case of attraction) is set to be smaller than the degree of modifica- tion of the step S124 (modification in the case of gazing).

When the step S124 ends, when the step S128 ends, when it is determined that the vehicle 2 is not traveling in the basic driving mode (step S120: NO), and when it is determined that the driver is not attracted to the display unit 6 (step S126: NO), the modification processing illustrated in FIG. 11 ends.

Figure 12:
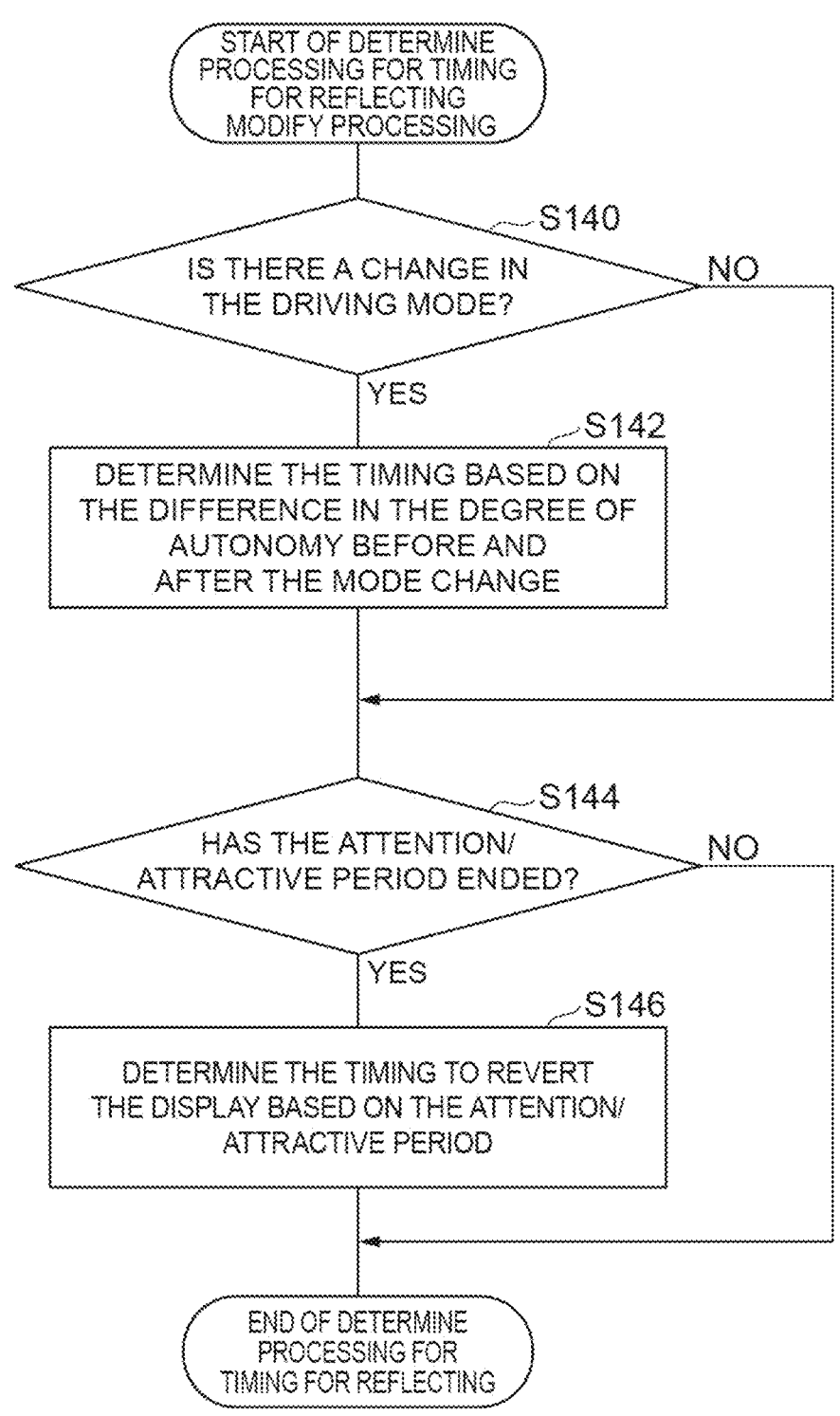
FIG. 12 is a flowchart illustrating an example of the reflection timing determination process.

Referring back to FIG. 10, the display ECU 5 determines a refresh interval and/or visibility reflection timing (step S14). Details of the reflection timing determination process- ing in step S14 are shown in FIG. 12. FIG. 12 is a flowchart illustrating an example of the reflection timing determina- tion process.

As shown in FIG. 12, the display ECU 5 first determines whether there is a change in the driving mode (step S140). The display ECU 5 determines that acquired from the operation ECU 22 is different from the driving mode stored in the storage unit 4, the determines that there is a change in the driving mode.

When it is determined that there is a change in the driving mode (step S140: YES), the display ECU 5 calculates the difference in the degree of autonomy before and after the driving mode change. Then, the display ECU 5 determines a timing according to the calculated difference (step S142). For example, the display ECU 5 sets the timing shorter than the initial value as the difference between the degrees of autonomy before and after the driving mode change is larger.

When the step S142 ends or when it is determined that there is no change in the driving mode (step S140: NO), the display ECU 5 determines whether or not the attention period and/or the attractive period ends (step S144). The display ECU 5 determines whether or not the attention period and/or the attractive period have ended based on the detection result of the driver monitoring sensor 3.

When it is determined that the attention period and/or the attractive period has ended (step S144: YES), the display ECU 5 determines a timing (return timing) for returning the display based on the attention period and/or the attractive period (step S146). The display ECU 5 sets the return timing longer than the initial value as the period during which the driver gazes is longer.

When the step S146 ends, or when it is determined that the attention period and/or the attractive period does not end (step S144: NO), the reflection timing determination process illustrated in FIG. 12 ends.

Returning to FIG. 10, the display ECU 5 displays information on the display unit 6 at the refresh interval and/or visibility determined in step S10 and step S12 and at the timing (reflection timing or return timing) determined in step S14 (step S16). When step S16 ends, the flowchart shown in FIG. 10 ends. The display ECU 5 starts the flowchart shown in FIG. 10 from the beginning until the end condition is satisfied.

SUMMARY OF EMBODIMENT

According to the display system 1, in a case where the degree of autonomy decreases due to the driving mode change compared to before the driving mode change, at least one of lengthening the refresh interval of the predetermined information displayed on the display unit 6 compared to before the driving mode change and lowering the visibility of the predetermined information compared to before the driving mode change is executed. When the degree of autonomy of the driving task decreases due to the driving mode change compared to that before the driving mode change, the driver needs to pay more attention to the surroundings of the vehicle than before the driving mode change. In the display unit 6, with a long refresh interval and information with reduced visibility can be suppressed from attracting the attention of the driver. Therefore, when the degree of autonomy of the driving task decreases due to the driving mode change as compared to before the driving mode change, the display system 1 can appropriately suppress the frequency at which the driver views the display unit 6.

While exemplary embodiments have been described above, various omissions, substitutions, and changes may be made without being limited to the exemplary embodiments described above.

For example, the display system 1 may execute the above-described control for suppressing attracting the attention of the driver on the condition that the current degree of autonomy is within a range of a predetermined degree of autonomy. The range of the predetermined degree of autonomy is set in advance in order to define a range in which the above-described control that suppresses attracting the attention of the driver is executed. For example, the range of the predetermined degree of autonomy may be a range of 0 to 1, a range of 0 to 2, or a range of 0 to 3. When the degree of autonomy decreases due to the driving mode change within the above-described predetermined degree of autonomy, the display system 1 performs at least one of lengthening the refresh interval of the predetermined information displayed on the display unit 6 compared to before the driving mode change and lowering the visibility of the predetermined information compared to before the driving mode change.

For example, in a case where the above-described predetermined degree of autonomy is in a range of 0 to 2, when the degree of autonomy of the driving task decreases from 2 to 1, at least one of making the refresh interval of the predetermined information displayed on the display unit 6 longer than before the driving mode change and making the visibility of the predetermined information lower than before the driving mode change is executed. In addition, when the degree of autonomy of the driving task decreases from 1 to 0, at least one of making the refresh interval of the predetermined information displayed on the display unit 6 longer than before the driving mode change and making the visibility of the predetermined information lower than before the driving mode change may be performed. That is, in the graph of FIG. 5, the refresh interval may monotonically decrease or gradually decrease when the degree of autonomy of the task is in a range of 0 to 2. When the degree of autonomy of the task is in a range of 3 to 5, the refresh interval may be arbitrarily set. For example, the refresh interval may monotonically decrease or gradually decrease as shown in the graph of FIG. 5, or in contrast to the graph of FIG. 5, the refresh interval may monotonically increase or gradually increase, or the refresh interval may be a constant value. Similarly, in the graph of FIG. 9, the visibility level may monotonically increase or gradually increase in a range in which the degree of autonomy of the task is 0 to 2. In a range where the degree of autonomy of the task is 3 to 5, the level of visibility may be arbitrarily set. For example, the visibility height may monotonically increase or gradually increase as shown in the graph of FIG. 9, or in contrast to the graph of FIG. 9, the visibility height may monotonically decrease or gradually decrease, or the visibility height may be a constant value.

The disclosure also includes the following clauses:

Clauses 1. A display system mounted on a vehicle that travels in a driving mode selected from among a plurality of driving modes having different degrees of autonomy of driving tasks, the display system comprising:

a display unit configured to display information to a driver; and a control unit configured to execute at least one of setting a refresh interval of predetermined information displayed on the display unit to be longer than that before a driving mode change and setting visibility of the predetermined information to be lower than that before the driving mode change, when a degree of autonomy decreases due to the driving mode change.

Clauses 2. The display system according to clauses 1, wherein the control unit determines at least one of a timing at which the refresh interval is made longer than before the driving mode change and a timing at which the visibility is made lower than before the driving mode change, in accordance with a difference in degree of autonomy before and after the driving mode change.

Clauses 3. The display system according to clauses 1 or 2, further comprising a driver monitoring sensor, wherein the plurality of driving modes includes a basic driving mode in which a driver performs all or a part of a driving task, and the control unit includes:

determining whether or not a driver of the vehicle is gazing at the display unit based on a detection result of the driver monitoring sensor when the vehicle travels in the basic driving mode; and performing at least one of lengthening the refresh interval and lowering the visibility when it is determined that the driver gazes at the display unit.

Clauses 4. The display system according to clauses 3, wherein the control unit includes:

determining whether or not the driver is drawn to the display unit based on a detection result of the driver monitoring sensor when the vehicle travels in the basic driving mode;

performing at least one of lengthening the refresh interval and lowering the visibility when it is determined that the driver is drawn to the display unit; and in a case where it is determined that the driver gazes at the display unit, performing at least one of lengthening the refresh interval and lowering the visibility as compared to a case where it is determined that the driver is drawn to the display unit.

Clauses 5. The display system according to clauses 3 or 4, wherein the control unit includes:

determining whether or not the driver is drawn to the display unit based on a detection result of the driver monitoring sensor when the vehicle travels in the basic driving mode;

lowering the visibility when it is determined that the driver is drawn to the display unit; and in a case where it is determined that the driver gazes at the display unit, lowering the visibility in a manner different from a case where it is determined that the driver is drawn to the display unit.

Clause 6. The display system according to any one of clauses 3 to 5, wherein the control unit includes:

in a case where it is determined that the driver who gazes at the display unit no longer gazes at the display unit, determining a timing at which at least one of the refresh interval and the visibility is returned based on a period during which the driver gazes.

What is claimed is:

1. A display system mounted on a vehicle that travels in a driving mode selected from among a plurality of driving modes having different degrees of autonomy of driving tasks, the display system comprising:

a display unit configured to display information to a driver; and an electronic control unit configured to perform at least one of setting a refresh interval of predetermined information displayed on the display unit to be longer than that before a driving mode change and setting visibility of the predetermined information to be lower than that before the driving mode change, when a degree of autonomy decreases due to the driving mode change, wherein the electronic control unit determines at least one of a timing at which the refresh interval is made longer than before the driving mode change and a timing at which the visibility is made lower than before the driving mode change, in accordance with a difference in degree of autonomy before and after the driving mode change.

2. The display system according to claim 1, further comprising a driver monitoring sensor, wherein the plurality of driving modes includes a basic driving mode in which a driver performs all or a part of a driving task, and the electronic control unit includes:

determining whether or not a driver of the vehicle is gazing at the display unit based on a detection result of the driver monitoring sensor when the vehicle travels in the basic driving mode; and performing at least one of lengthening the refresh interval and lowering the visibility when it is determined that the driver gazes at the display unit.

3. The display system according to claim 2, wherein the electronic control unit further includes:

determining whether or not the driver is drawn to the display unit based on a detection result of the driver monitoring sensor when the vehicle travels in the basic driving mode;

performing at least one of lengthening the refresh interval and lowering the visibility when it is determined that the driver is drawn to the display unit; and in a case where it is determined that the driver gazes at the display unit, performing at least one of lengthening the refresh interval and lowering the visibility as compared to a case where it is determined that the driver is drawn to the display unit.

4. The display system according to claim 2, wherein the electronic control unit further includes:

determining whether or not the driver is drawn to the display unit based on a detection result of the driver monitoring sensor when the vehicle travels in the basic driving mode;

lowering the visibility when it is determined that the driver is drawn to the display unit; and in a case where it is determined that the driver gazes at the display unit, lowering the visibility in a manner different from a case where it is determined that the driver is drawn to the display unit.

5. The display system according to claim 2, wherein the electronic control unit further includes:

in a case where it is determined that the driver who gazes at the display unit no longer gazes at the display unit, determining a timing at which at least one of the refresh interval and the visibility is returned based on a period during which the driver gazes.

6. A display system mounted on a vehicle that travels in a driving mode selected from among a plurality of driving modes having different degrees of autonomy of driving tasks, the display system comprising:

a display unit configured to display information to a driver;

an electronic control unit configured to perform at least one of setting a refresh interval of predetermined information displayed on the display unit to be longer than that before a driving mode change and setting visibility of the predetermined information to be lower than that before the driving mode change, when a degree of autonomy decreases due to the driving mode change; and a driver monitoring sensor, wherein the plurality of driving modes includes a basic driving mode in which a driver performs all or a part of a driving task, and wherein the electronic control unit further includes:

determining whether or not a driver of the vehicle is gazing at the display unit based on a detection result of the driver monitoring sensor when the vehicle travels in the basic driving mode;

performing at least one of lengthening the refresh interval and lowering the visibility when it is determined that the driver gazes at the display unit; and in a case where it is determined that the driver who gazes at the display unit no longer gazes at the display unit, determining a timing at which at least one of the refresh interval and the visibility is returned based on a period during which the driver gazes.

* * * * *